United States Patent [19]

Shenk

[11] 4,023,187

[45] May 10, 1977

[54] EXPOSURE CONTROL SYSTEM WITH FILL FLASH RACE CONDITION

[75] Inventor: Edwin K. Shenk, Westford, Mass.

[73] Assignee: Polaroid Corporation, Cambridge, Mass.

[22] Filed: Oct. 3, 1975

[21] Appl. No.: 619,384

[52] U.S. Cl. .................................. 354/27; 354/32; 354/33; 354/34; 354/60 F
[51] Int. Cl.² ......................................... G03B 7/16
[58] Field of Search ................. 354/27, 32, 33, 34, 354/35, 60 F, 247

[56] References Cited

UNITED STATES PATENTS

| | | | |
|---|---|---|---|
| 3,610,122 | 10/1971 | Biber | 354/35 |
| 3,667,357 | 6/1972 | Matsuda | 354/60 F |
| 3,820,128 | 6/1974 | Burgarella et al. | 354/32 |
| 3,836,920 | 9/1974 | Uchiyama et al. | 354/27 |
| 3,855,601 | 12/1974 | Uchiyama et al. | 354/33 |
| 3,942,183 | 3/1976 | Whiteside | 354/247 |

Primary Examiner—Russell E. Adams, Jr.
Attorney, Agent, or Firm—Edward S. Roman

[57] ABSTRACT

An artificial illumination control system is provided for a photographic camera for operation in a manner whereby under extremely low levels of ambient light intensity, the control system initiates the energization of a source of artificial illumination at a predetermined time period subsequent to the initiation of the exposure interval while under conditions of substantially higher levels of ambient light intensity, the control system initiates the energization of the source of artificial illumination as a consequence of the time integration of the scene light intensity incident to a photoresponsive element reaching a predetermined value. Hence, the artificial illumination control system may be automatically operated in both a normal flash mode and a "fill-in flash" mode.

22 Claims, 16 Drawing Figures

EXPOSURE CONTROL SYSTEM WITH FILL FLASH RACE CONDITION

BACKGROUND OF THE INVENTION

1. Field of the Invention

This invention relates generally to an artificial illumination control system for photographic apparatus and, more particularly, to an artificial illumination control system for controlling the energization of a source of artificial illumination in a "fill-in flash" mode of operation where ambient light levels are relatively high, but portions of the photographic subject are relatively dark.

2. Description of the Prior Art

When taking a photograph under conditions at which the levels of ambient light intensity are relatively high but portions of the photographic subjects are relatively dark, it may be desirable to provide additional scene illumination from a source of artificial illumination such as a flashbulb or from an electronic flash device sometimes referred to as a "strobe" unit. Situations where a source of artificial illumination are used in relatively high ambient light levels are commonly referred to as "fill-in flash" mode operation as more fully described in a U.S. Pat. No. 3,610,122 entitled "Shutter Timing System" issued Oct. 5, 1971, by C. H. Biber and assigned in common herewith. Automatic photographic exposure control systems of the type typically configured to combine a light sensitive timing network and a voltage sensitive triggering circuit, or the like, in controlling relationship with a shutter assembly may also be utilized in photographic situations requiring a "fill-in flash" form of illumination. Such automatic exposure control systems are capable of providing full control over the regulation of a "fill-in flash" exposure interval and must also be compatible for operation with artificial illumination under scene conditions representing relatively low ambient light levels.

In order to facilitate automatic exposure control, it is generally preferable that the shutter blade elements assume their maximum effective aperture defining position prior to the energization of a source of artificial illumination. Thus, the artificial light source may be triggered to illuminate upon the closing of a triggering switch as one of the shutter blade elements moves into its light unblocking terminal position as more fully described in U.S. Pat. No. 3,610,122 supra.

Photographic apparatus have recently embodied so-called "follow focus systems" which depend upon the principle that the anticipated light level at a camera will depend upon the known characteristics of the artificial light source which is used and upon the distance of the subject being photographed to the artificial light source. Thus, in shutter blade systems of the scanning type, the mechanism for opening and closing a continuously variable exposure aperture is coupled to the lens focusing system of the camera which moves the lens system in accordance with the distance from the lens to subject being photographed. As the lens system is moved to provide the correct focus for a particular distance from the camera to the subject, the coupling mechanism of the follow focus control system also moves to determine an appropriate maximum exposure opening in response to the focusing action, and the maximum aperture is limited in accordance with anticipated light level at the scene to be photographed. Hence, the maximum aperture to which the shutter blade elements move may vary with lens focusing, and thus it may become impractical to utilize a switch to signal the movement of the shutter blade elements to their largest aperture defining position.

Instead, a time delay circuit responsive to the initiation of the exposure interval may be utilized to energize the artificial light source when the shutter blade elements reach their largest aperture defining position regardless of lens focusing or follow focus setting. However, under conditions of relatively high levels of ambient light intensity where the artificial light source is utilized for "fill-in flash" mode purposes, the predetermined time delay may terminate after the desired film exposure. Thus, during the "fill-in flash" mode of operation, film could become overexposed from the high levels of ambient light intensity prior to the predetermined time delay required to energize the artificial light source subsequent to the initiation of the exposure interval.

Therefore, a primary object of this invention is to provide a control system for a source of artificial illumination which may be utilized in either low levels of ambient light intensity or high levels of ambient light intensity for "fill-in flash" mode operation.

It is a further object of this invention to provide an automatic artificial illumination control system compatible for operation with an automatic exposure control system for providing a correct exposure with artificial illumination regardless of the levels of ambient light intensity.

It is an additional object of this invention to provide an automatic artificial illumination control system for energizing a source of artificial illumination as a function of whichever of two predetermined events first occurs.

Other objects of the invention will in part be obvious and will in part appear hereinafter. The invention accordingly comprises the mechanism and system possessing the construction, combination of elements and arrangement of parts which are exemplified in the following detailed disclosure.

SUMMARY OF THE INVENTION

The invention relates generally to a system for controlling the energization of a source of artificial illumination during a photographic exposure interval. The system includes means for connecting to a source of electrical energy as well as means responsive to the commencement of a photographic exposure interval to provide a first select output signal condition at a predetermined time interval subsequent to the commencement of the photographic exposure interval. There are additionally included means for detecting and integrating scene light incident to the camera apparatus subsequent to the commencement of the photographic exposure interval in order to provide an output signal condition corresponding to the integrated scene light. Means responsive to a select change in the value of the output signal condition of the integrating means after the commencement of the photographic cycle provide a second select output signal condition. Means responsive to the first of either the first or second select output signal conditions operate to initiate the energization of the source of artificial illumination.

DESCRIPTION OF THE DRAWINGS

The novel features that are considered characteristic of the invention are set forth with particularity in the appended claims. The invention itself, however, both as to its organization and its method of operation together with other objects and advantages thereof will be best understood from the following description of the illustrated embodiment when read in connection with the accompanying drawings wherein:

FIG. 4b is a graphical representation of scene light intensity vs. time for the mode of operation of FIG. 4a;

FIG. 4c is a graphical representation of exposure vs. time for the mode of operation for FIG. 4a;

FIG. 5b is a graphical representation of scene light intensity vs. time for the mode of operation of FIG. 5a;

FIG. 5c is a graphical representation of exposure vs. time for the mode of operation for FIG. 5a;

FIG. 6b is a graphical representation of scene light intensity vs. time for the mode of operation of FIG. 6a;

FIG. 6c is a graphical representation of exposure vs. time for the mode of operation of FIG. 6a;

DESCRIPTION OF THE PREFERRED EMBODIMENT

Figure 1:
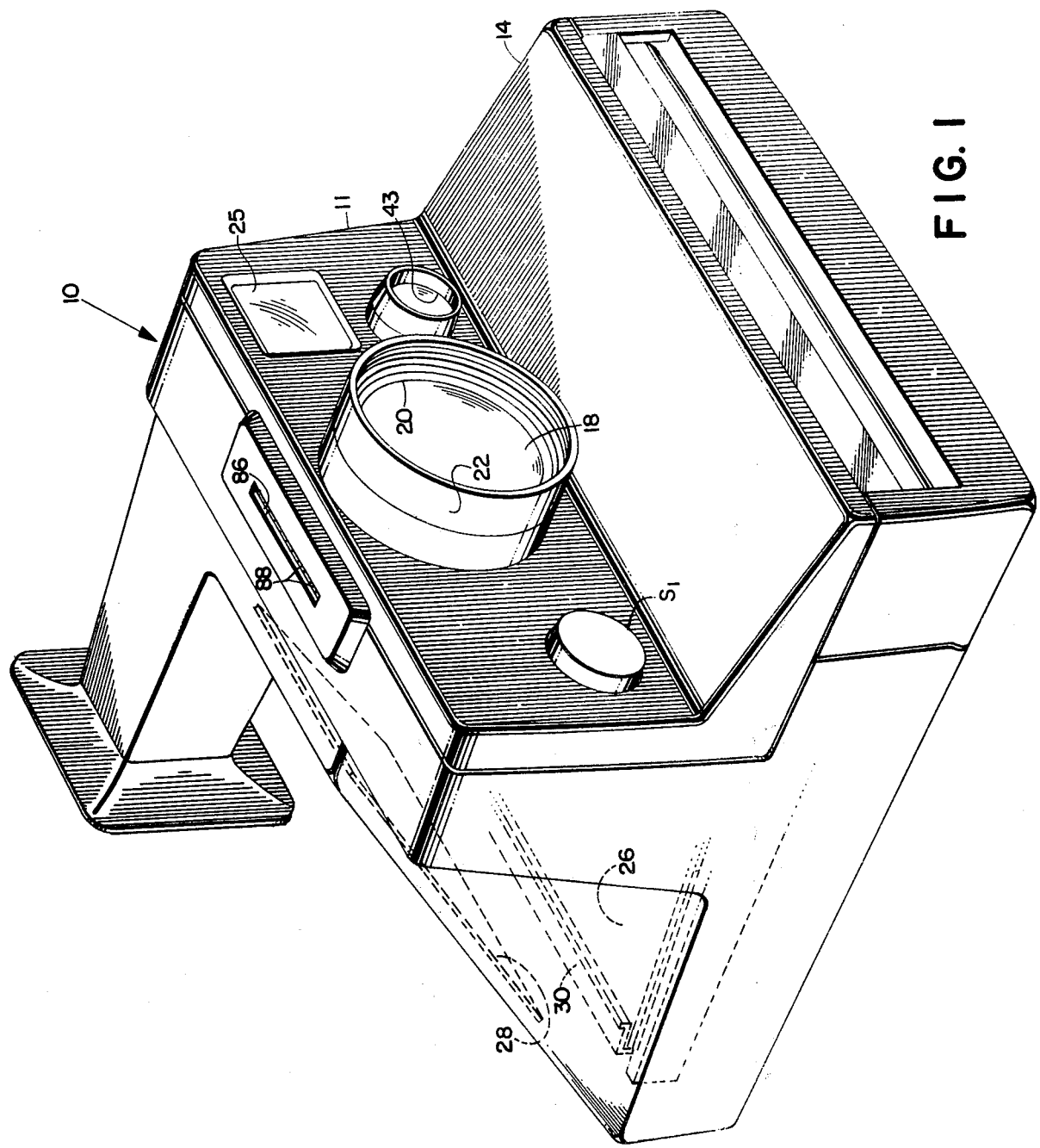
FIG. 1 is a perspective view of a photographic camera apparatus embodying the artificial illumination control system of this invention.
Figure 2:
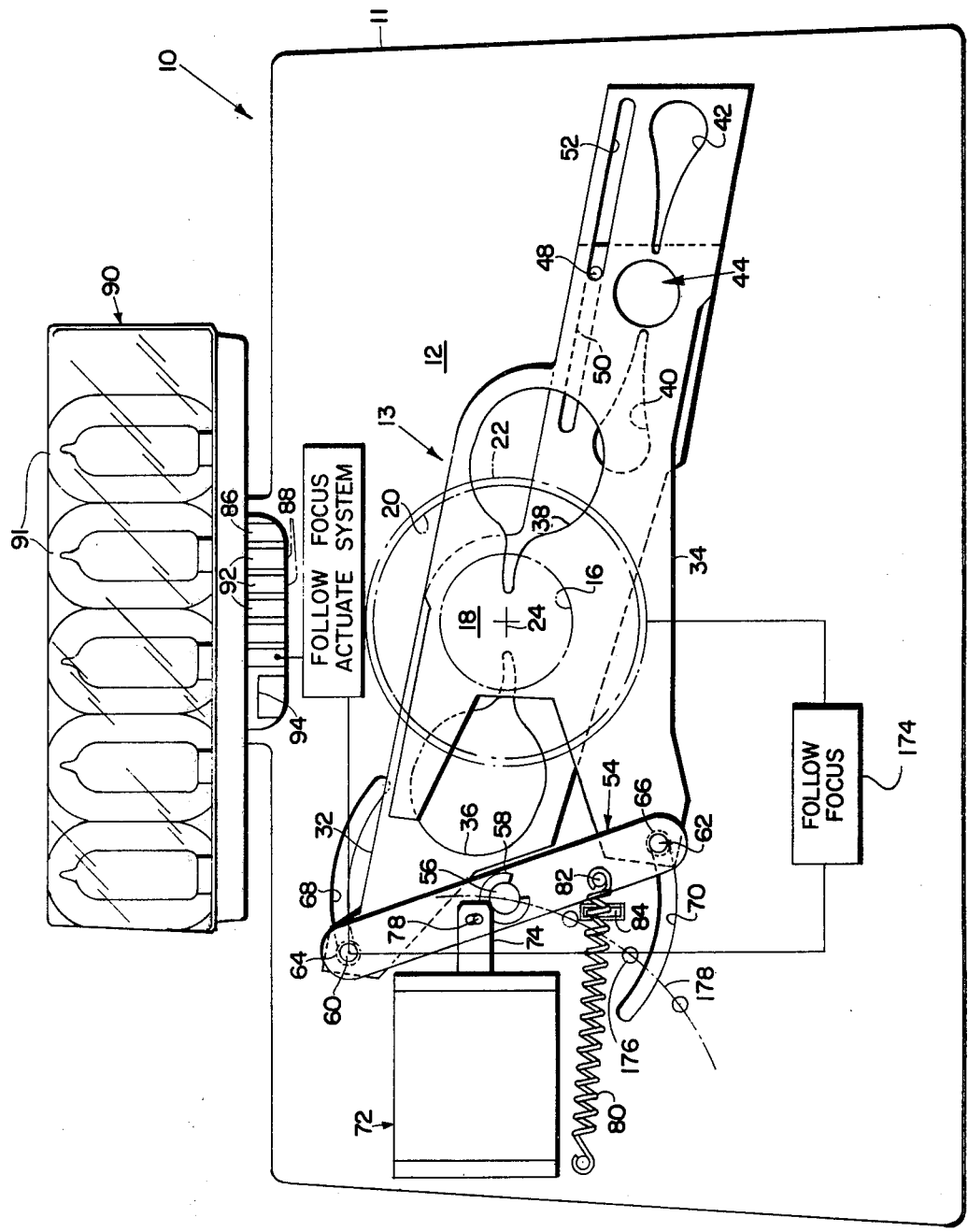
FIG. 2 is a front cross-sectional view of the camera of FIG. 1, showing a portion of the exposure control system.

Referring now to FIGS. 1 and 2, it can be seen that the artificial illumination control system of this invention is associated with a photographic camera apparatus 10 contained within a housing 11. A baseblock casting 12 is fixedly stationed with the housing 11 and selectively machined to support the various components of an exposure mechanism shown generally at 13. Surrounding the front and top of the baseblock casting 12, there is provided a cover section 14 which includes at least one opening through which extends a manually adjustable focus bezel 22. Centrally disposed within the baseblock casting 12, there is provided a light entering exposure opening 16 which defines the maximum available exposure aperture for the system.

An objective or taking lens 18 is provided in overlying relation to the light entering opening 16 wherein the objective lens 18 may comprise a plurality of elements retained in predetermined spaced relation by a cylindrical lens mount 20 which is externally threaded for toothed engagement within the internally threaded focus bezel 22. As is readily apparent, focus bezel 22 is made rotatable with respect to the front cover 14 to provide translational movement of the elements of lens 18 along the center axis 24 of the optical path of the housing 11. As is readily apparent, the central optical axis 24 is illustrated in FIG. 2 as being normal to the plane of the drawing. Thus, rotation of the focus bezel 22 may be carried out by manual rotation to provide displacement of the elements of objective lens 18 for focusing of image carrying rays through the light entering exposure opening 16 to a rearwardly positioned film plane 26 by way of a reflecting mirror 28 all of which are stationed within a suitable light tight film exposure chamber 30 within the housing 11.

Intermediate the objective lens 18 and light entering exposure opening 16, there are supported two overlapping shutter blade elements 32 and 34 which will be subsequently described in greater detail herein. Extending from the front cover 14 there is provided a photographic cycle initiating button $S_1$, the depression of which commences the exposure interval by ultimately effecting the release of the shutter blade elements 32 and 34. In addition, there is provided a viewfinder shown generally at 25 which enables a photographer to properly frame the desired scene to be photographed.

A pair of scene light admitting primary apertures 36 and 38 are provided respectively in the blade elements 32 and 34 to collectively define a progressive variation from effective aperture openings in accordance with simultaneous longitudinal and lateral displacement of one blade element with respect to the other blade element in a manner as is fully described in a U.S. patent application Ser. No. 585,128 entitled "Camera With Pivoting Blades" by George D. Whiteside, filed July 2, 1974, and assigned in common herewith. The apertures 36 and 38 are selectively shaped so as to overlap the light entering exposure opening 16 thereby defining a gradually varying effective aperture size as a function of the position of the blade elements 32 and 34.

Figure 3:
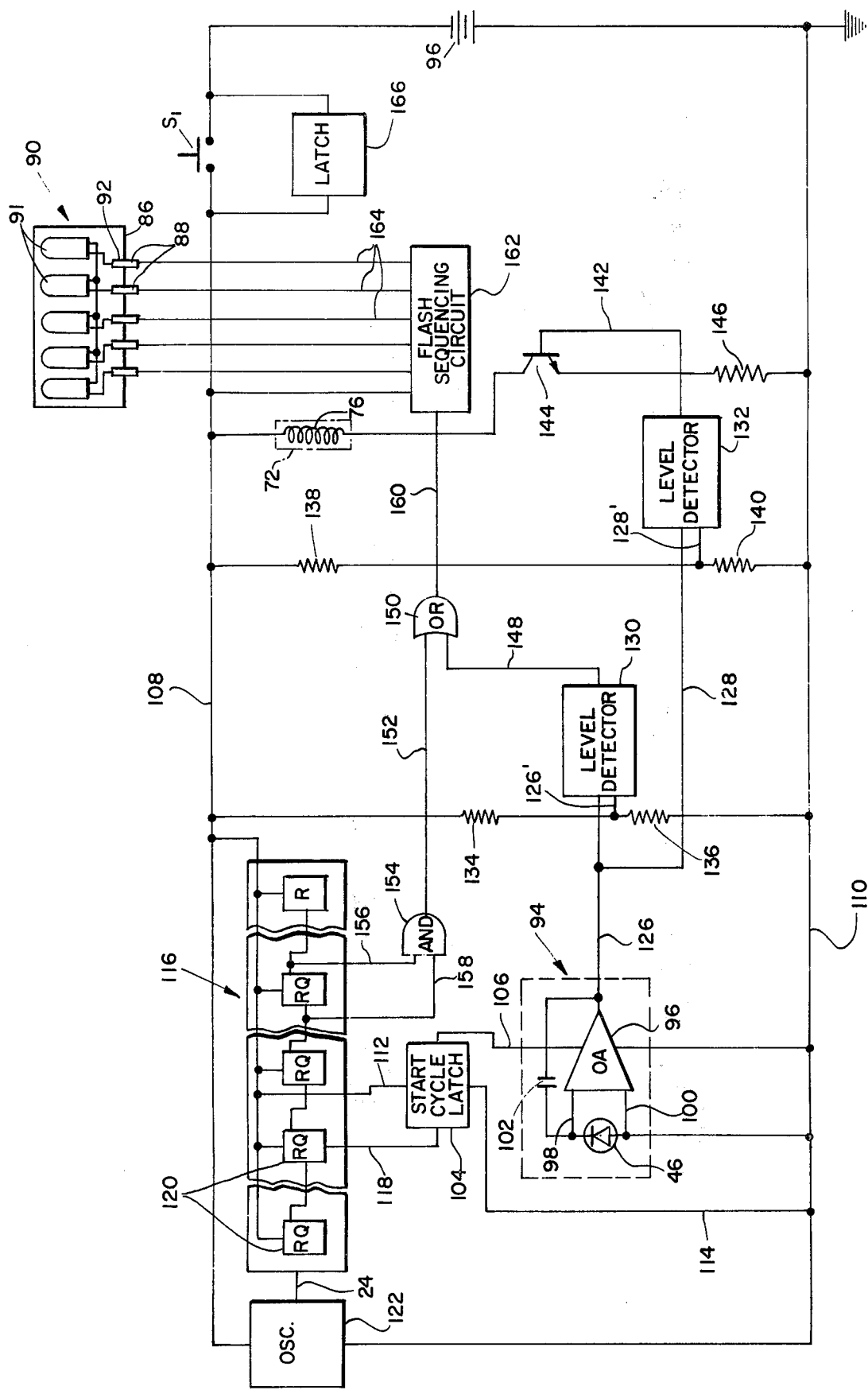
FIG. 3 is a schematic diagram showing the artificial illumination control system of this invention.

Each of the blades, 32 and 34, may additionally be configured to have corresponding photocell sweep secondary apertures shown respectively at 40 and 42. Secondary apertures 40 and 42 may be configured in correspondence with the shapes of scene light admitting primary apertures 32 and 34. As is readily apparent, the secondary apertures 40 and 42 also move in correspondence with the primary apertures 36 and 38 to define a small secondary effective aperture for admitting the passage of scene light transmitted through a second opening 42 in the cover 14 from the scene being photographed. Scene light admitted by the photocell secondary apertures 40 and 42 is thereafter directed to a light detecting station shown generally at 44. The light detecting station includes a photoresponsive element 46 which cooperates with light integrating and control circuitry as shown in FIG. 3 to terminate an exposure interval as a function of the amount of light received through the secondary effective aperture defined by the overlapping sweep apertures 40 and 42.

Projecting from the baseblock casting 12 at a location spaced laterally apart from the light entering exposure opening 16, is a pivot pin or stud 48 which pivotally and translatively engages elongate slots 50 and 52 formed in respective shutter blade elements 32 and 34. Pin 48 may be integrally formed with the baseblock casting 12 and blade elements 32 and 34 may be retained in engaging relation with respect to the pin 48 by any suitable means such as peening over the outside end of pin 48.

The opposite ends of the blade elements 32 and 34 respectively include extended portions which pivotally connect to a walking beam 54. Beam 54, in turn, is disposed for rotation relative to the baseblock casting 12 by pivotal connection to a projecting pivot pin or stud 56 which may be integrally formed with the baseblock casting 12 at a location spaced laterally apart from the light entering exposure opening 16. The walking beam 54 may be pivotally retained with respect to the pin 56 by conventional means such as an E ring 58. In the preferred mode, the walking beam 54 is pivotally connected at its distal ends to the shutter blade elements 32 and 34 by respective pin members 60 and 62 which extend laterally outward from the walking beam 54. Pin members 60 and 62 are preferably circular in cross section and extend through respective circular openings 64 and 66 in respective blade elements 32 and 34 so as to slidably engage respective arcuate slots or tracks 68 and 70 which may be integrally formed within the baseblock casting 12. The arcuate tracks 68 and 70 operate to inhibit disengagement of the blade elements 32 and 34 from their respective pin members 60 and 62 during operation of the exposure control system.

A tractive electromagnetic device in the form of a solenoid 72 is employed to displace the shutter blades 32 and 34 with respect to each other and the casting 12. The solenoid 72 may be of special design, to be subsequently described in greater detail, wherein the solenoid 72 includes an internally disposed cylindrical plunger unit 74 which retracts inwardly into the body of the solenoid upon energization of a solenoid coil or winding as shown at 76 in FIG. 3. The solenoid plunger 74 may be affixed to the walking beam 54 by means of a pivot pin or stud 78 such that longitudinal displacement of the plunger 74 will operate to rotate the walking beam around the pivot pin 56 so as to appropriately displace the shutter blades 32 and 34.

The baseblock casting 12 supports the solenoid 72 in a position above a biasing tension spring 80 which operates to continuously urge the blade elements 32 and 34 into positions defining their largest effective aperture over the light entry exposure opening 16. The movable end of spring 80 is attached to walking beam 54 by a pin 82 while the stationary end of spring 80 is grounded with respect to the baseblock casting 12. Thus, with the spring connection herein described, the exposure control system of this invention is biased to continuously urge the shutter blade elements 32 and 34 into an open orientation.

In the present arrangement, the shutter blades 32 and 34 are drawn from their open position to their closed position as shown in FIG. 2 when the solenoid 72 is energized. Consequently, energization of solenoid 72 prevents the shutter blades 32, 34 from moving towards their maximum aperture opening under the urging of spring 80. However, as should be readily understood, the artificial illumination control system of this invention would be equally applicable to photographic systems where the blades 32 and 34 are spring biased in a normally closed position.

Continued energization of the solenoid 72 in order to maintain the shutter blade elements 32 and 34 in their closed positions may result in an undesirable drain in the camera apparatus power source which preferably is an electrical storage battery schematically shown in FIG. 3 at 96. Thus, a mechanical latch as shown generally at 84 may be provided to move into lateral engagement with an edge of the walking beam 54 so as to maintain the blade elements 32 and 34 in their closed position regardless of the energization of solenoid 72. Additional information regarding the structure and operation of the latch 84 is described in an application for U.S. patent, Ser. No. 554,777 entitled "Photographic Apparatus with Sequencing System" by B. K. Johnson, D. Van Allen, and G. D. Whiteside, filed Mar. 3, 1975 in common assignment herewith.

The photographic camera apparatus 10 is utilized in conjunction with a source of artificial illumination which preferably comprises a linear array of flash lamps as shown generally at 90. The linear flash array includes a plurality of individually spaced apart flash lamps 92 which respectively connect to a plurality of spaced apart terminal pads or elements 92. The linear flash array 90 may be releasably connected with respect to the camera housing 11 by way of a receiving socket 86 which also includes a plurality of spaced apart terminal pads or elements 88. The linear flash array 90 may be inserted and withdrawn from the receiving socket 86 in a manner as is fully described in U.S. Pat. No. 3,757,643 entitled "Photoflash Apparatus" by John Burgarella issued Sept. 11, 1973, and assigned in common herewith.

Under conditions of artificial illumination wherein the light has a relatively short duration such as from the individual flash lamps 91 of the linear array 90, the anticipated light level at the camera will depend upon the known characteristics of the flash lamps 91 and upon the distance from the subject being photographed to the light source. When the flash array 90 is mounted on the receiving socket 86, there may be actuated a follow focus system whereby the maximum effective aperture to which the shutter blade elements 32, 34 are allowed to progress is determined in accordance with the distance from the taking lens 18 to the subject being photographed. Thus, as the focus bezel 22 is rotated to provide the correct focus for a particular distance from the photographic apparatus 10 to the subject, a follow focus mechanism (shown generally at 174) moves to appropriately displace a follow focus interceptor pin 176 about its locus of travel as shown by a phantom line 178. The follow focus interceptor pin 176 may be selectively actuated to intercept the edge of walking beam 54 in a well known manner as is more fully described in a U.S. Pat. Ser. 3,972,057 entitled "Exposure Control System With Improved Follow Focus Capability For Photographic Apparatus", by George D. Whiteside, filed July 27, 1976, and assigned in common herewith. Thus, as is readily apparent, the walking beam 54 may be intercepted by the follow focus interceptor pin 176 at various locations defining various maximum effective apertures which correspond to the distance from which the subject is spaced from the camera apparatus 10.

Turning now to FIG. 3, there is shown a schematic diagram for the artificial illumination control circuitry of this invention including a scene light detecting and integrating circuit shown generally at 94. Circuit 94 includes the photoresponsive element 46 which may be a photovoltaic cell of the type generating an output signal in correspondence with the levels of scene light intensity incident thereon. The photoresponsive element 46 is orientated to evaluate the light levels of a scene coincident with the field of view of the lens system of the camera and operates in conjunction with the above described aperture scanning arrangement which alters the amount of scene light reaching the photoresponsive element 46 in synchronism and corresponding variation with the progressively changing aperture size. The photoresponsive element 46 is coupled with an amplifier stage 96 along input lines 98 and 100 wherein the amplifier 96 is of a type sometimes referred to in the art as an "operational amplifier" which may be of a differential variety preferably fabricated in practical miniaturized form. When considered ideally, the amplifier 96 has infinite gain and infinite input impedance and a zero output impedance.

By virtue of a feedback path comprising an integration capacitor 102 connected between the input line 98 and an output line 126 from the operational amplifier 96, the photoresponsive element 46 is permitted to operate into an apparent low-input impedance so as to function in a current mode, the current generated by the photoresponsive element 46 being limited substantially only by its own internal impedence. Thus, under such loading, the photoresponsive element 46 in conjunction with the operational amplifier 96 and capacitor 102 is capable of providing a desirable linear output corresponding to the time integration of scene light intensity incident to the photoresponsive element 46.

Any difference of potential supplied by the photoresponsive element 46 across input leads 98 and 100 causes a voltage to be produced at output line 126. The relatively low signal voltages at the input of amplifier 96 which are present with the relatively low signal current from the photoresponsive element 46 are acted upon by the correspondingly high gain characteristic of the amplifier. Thus, although the amplifier 96 has a very high input impedance, the photoresponsive element 46, when connected in the circuit described, experiences only a very low impedance. Therefore, the current output of the photoresponsive element 46 is directed into the feedback path.

The initial charging of the integration capacitor 102 is synchronized with shutter blade actuation by means of a start cycle latch circuit shown generally at 104 which provides an output actuation signal to the operational amplifier 96 by way of interconnecting line 106. The start cycle latch circuit 104 is connected to the supply line 108 and ground line 110 by way of lines 112 and 114 respectively and is made responsive to the output signal from a ripple counter 116 by way of an interconnecting line 118. The ripple counter 116, in turn, comprises a plurality of serially connected binary circuits 120, each of which can provide an output control signal in a predetermined time sequence as is well known in the art. Binary circuits 120 may be ordinary "flip flops" interconnected in serial relation with respect to each other whereby the binary count rate is determined by as oscillator circuit 122 connected thereto by way of a line 124.

The output signal from the light detecting and integrating circuit 94 at line 126 is directed to a pair of level detector circuits 130 and 132 by way of interconnecting lines 126 and 128 respectively wherein level detector 130 controls the "fill flash" function to be subsequently described. Each level detector 130 and 132 may be of any conventional design such as a Schmitt Trigger. As is readily apparent, the steady state reference voltage to the level detector 130 is established by biasing means comprising a first resistor 134 connected between the supply line 108 and the input line 126' together with a second resistor 136 connected between the input line 126' and the ground line 110. In like manner, the steady-state reference voltage level to the detector 132 is established by biasing means comprising a third resistor 138 connected between the supply line 108 and the input line 128' and a fourth resistor 140 connected between the input line 128' and the ground line 110.

The output signal from detector 132 is directed to the base of an NPN transistor 144 by way of an interconnecting line 142. The collector of transistor 144, in turn, is connected to the supply line 108 by way of the solenoid winding 76, while the emitter of transistor 144 is connected to the ground line 110. The output signal from the level detector circuit 130 is directed to an OR gate 150 by way of line 148. The output from the OR gate 150 in turn is directed by way of an interconnecting line 160 to a flash sequencing circuit 162 which may be of a conventional type as is more fully described in U.S. Pat. No. 3,618,492 entitled "Flash Photographic System", by S. Ellin, issued Nov. 9, 1971, and assigned in common herewith. The flash sequencing circuit 162 operatively connects to the linear flash array 90 upon the insertion thereof into the flash array receiving socket 86. The operative connection is made possible by the plurality of spaced apart terminal pads or elements 88 in the receiving socket 86, which elements are electrically connected to the flash sequencing circuit 162 by way of lines 164 respectively. Thus, insertion of the linear flash array 90 within the receiving socket 86 operates to bring the terminal elements 92 into respective electrical connection with the terminal elements 88. The flash sequencing circuit 162 thereafter operates to sequentially ignite the individual flash-lamps 91 by automatically passing a monitoring current through each of the flashlamps during each exposure cycle to derive alignment signals as is fully explained in U.S. Pat. No. 3,618,492, supra.

A second input signal to the OR gate 150 is derived from an AND gate 154 by way of an interconnecting line 152. The AND gate 154, in turn, receives an output signal from the ripple counter 116 by way of lines 156 and 158. As is now readily apparent, the output signal from the AND gate 154 is timed to occur at a predetermined interval subsequent to the actuation of the start cycle latch 104, which coincides to the initiation of the actual exposure interval period.

Figure 4A:
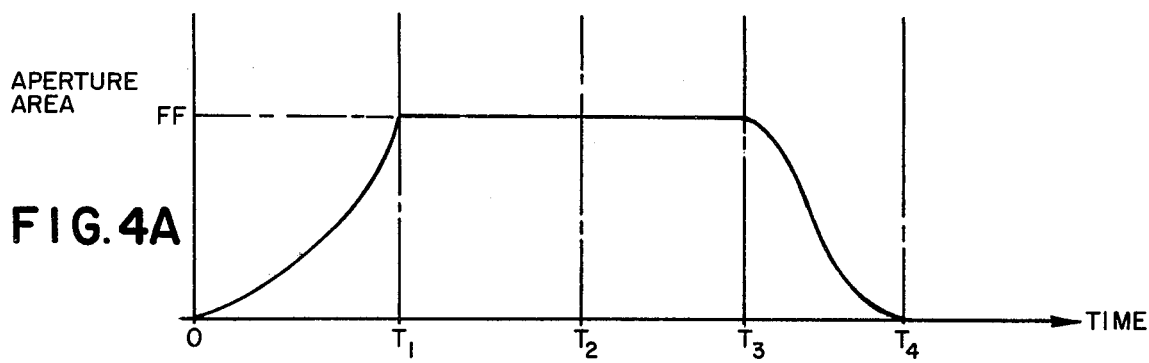
FIG. 4a is a graphical representation of aperture area vs. time for one mode of operation.
Figure 4B:
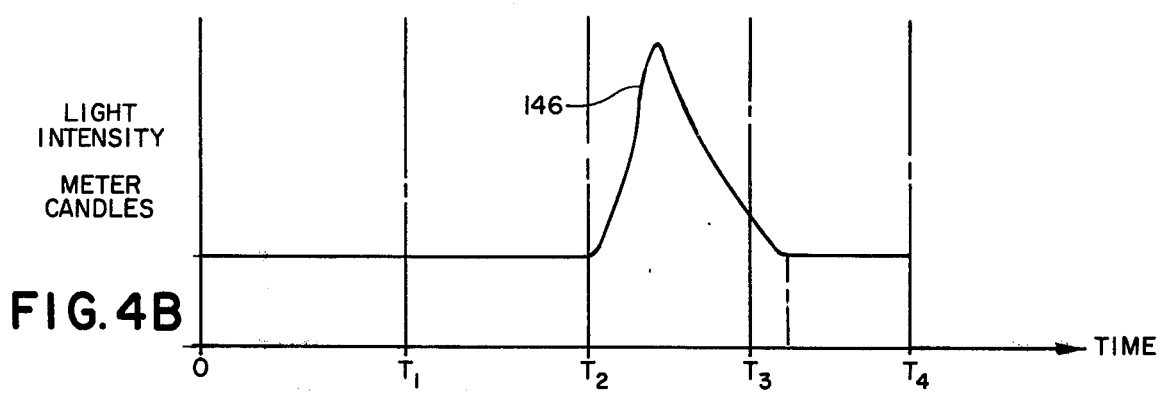
Figure 4C:
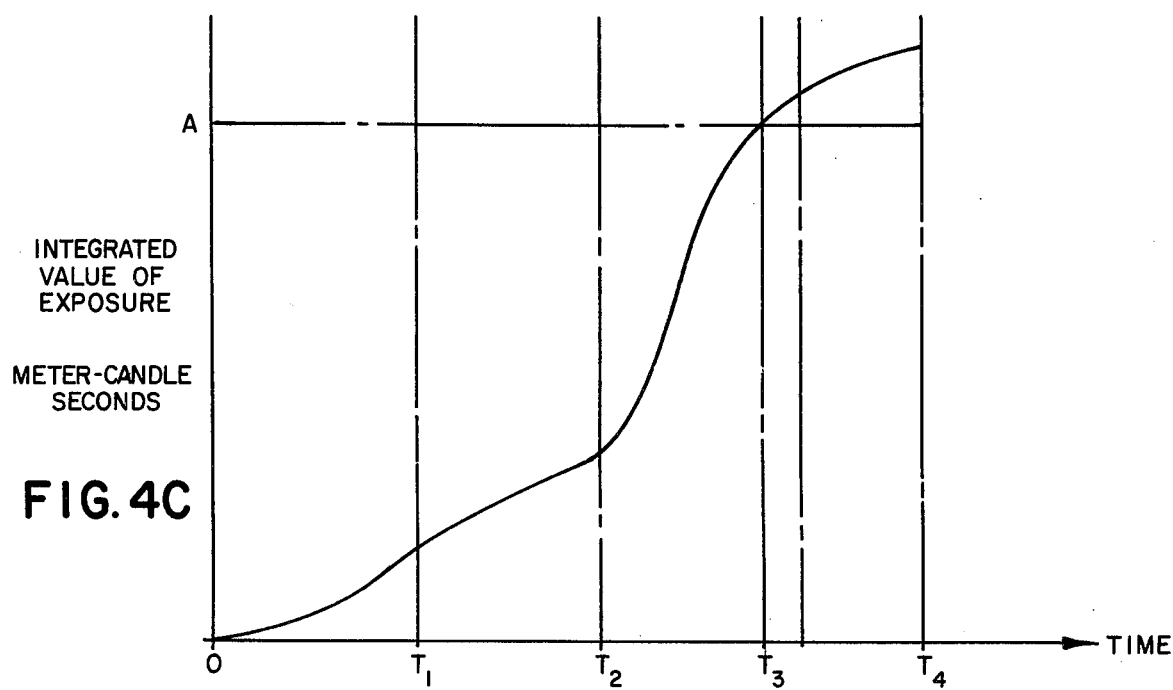

Referring now to FIGS. 4a–4c, there is shown a graphical representation for a photographic exposure interval during low ambient light intensity conditions as will become more apparent from the following discussion. Subsequent to the insertion of the linear flash array 90 within the flash array receiving socket 86, a low ambient light intensity photographic exposure interval may be commenced upon the depression of the photographic exposure interval initiating button $S_1$. As will become readily apparent, the operational sequence for the various embodiments of the exposure control system of this invention are described in relation to a photographic camera of the non-single lens reflex type, although the intended scope of the invention is by no means so limited and cameras of the well known reflex type as described in U.S. Pat. No. 3,672,281 entitled "Reflex Camera" by E. H. Land may be equally suitable for embodying the exposure control system of this invention. Thus, closure of switch $S_1$ operates to simultaneously move the latch 84 out of engagement with the edge of the walking beam 54 in a manner fully described in U.S. patent application Ser. No. 554,777, supra, as well as to energize the exposure control circuitry of FIG. 3. Disengagement of the latch 84 from the edge of the walking beam 54 permits tension spring 80 to rotate the walking beam 54 in a clockwise direction as viewed in FIG. 2. In this manner the shutter blade elements 32 and 34 are moved in directions which operate to progressively enlarge the effective aperture over the light entering exposure opening 16 as graphically shown by the aperture area vs. time curve of FIG. 4a. Rotation of the walking beam 54 effects simultaneous linear and angular displacement of the shutter blade elements 32 and 34 about pivot pin 48 so that photocell sweep secondary apertures 40 and 42 simultaneously define a corresponding progressively enlarging aperture opening over the photoresponsive element 46.

As is readily apparent, the battery supply voltage across lines 108 and 110 will be maintained only as long as the operator maintains switch $S_1$ in its depressed state, which may be perfectly adequate for situations where the human reaction time in depressing and releasing the switch $S_1$ substantially exceeds the longest exposure time likely to be incurred. However, in situations where the normal exposure time is likely to exceed the human reaction time in depressing and releasing switch $S_1$, there may be provided a latch circuit, as shown generally at 166, in parallel connection with respect to the switch $S_1$ for maintaining continuous energization of the exposure control circuit even after the release of the switch $S_1$. A suitable automatic latch circuit is more fully described in U.S. Pat. No. 3,744,385 entitled "Control System For Photographic Apparatus", by Burgarella et al, issued July 10, 1973 and assigned in common herewith.

Preferably, the insertion of the linear flash array 90 within the flash array receiving socket 86 also operates to actuate the follow focus mechanism 174 so as to move the interceptor pin 176 into the walking beam 54 locus of travel. As previously discussed, rotation of the focus bezel 22 to focus the objective lens 18 also operates to move the interceptor pin 176 along the phantom line 178. Thus, the maximum effective aperture to which the shutter blade elements 32 and 34 may be progressively opened is limited by the point of interception of the pin 176 with the edge of the walking beam 54, as is shown graphically on the curve of FIG. 4a at "FF".

The photoresponsive element 46 provides an appropriate voltage response corresponding to the scene light intensity incident thereon, which voltage response is thereafter integrated by the operational amplifier 96 and feedback capacitor 102 to provide an output signal representative of the time integration of the scene light intensity incident to the photoresponsive element 46. A curve representing the approximate time integration of scene light intensity incident to the photoresponsive element 46 is shown at FIG. 4c where the axis of ordinates is calibrated in meter-candle-seconds and the axis of abcissas is calibrated in units of time. In order that the graphical representation of the time integration of the scene light intensity incident to the photoresponsive element 46 vs. time be more readily understood, there is also provided a graphical representation of scene light intensity in meter-candles vs. time as shown in FIG. 4b.

The overlapping shutter blade elements 32 and 34 are thus moved to their maximum effective aperture defining position as established by the interception of the walking beam 54 with the follow focus interceptor pin 176 at time $T_1$. As is readily apparent from the graph of FIG. 4b, the low ambient light intensity remains substantially constant during the time required for the shutter blade elements to reach their follow focus setting and for a period thereafter up until time $T_2$, at which point a respective flashlamp 91 is energized to provide a sharply rising pulse of light intensity as shown generally in FIG. 4b at 146. The flashlamp 91 of the linear flash array 90 is energized at time $T_2$ as a result of the ripple counter 116 providing the requisite output signals at lines 156 and 158 to switch the AND gate 154 and provide an output signal at line 152 to the OR gate 150. The OR gate 150, in turn, switches to provide a flash igniting signal to the flash sequencing circuit 162 by way of interconnecting line 160.

As should now be readily apparent, the requisite output signals at lines 156 and 158 to fire a flashlamp occur at a predetermined time period $T_2$ subsequent to the initiation of an exposure interval at $T_0$. The predetermined time period between $T_0$ and $T_2$ is selected to be at least as long as the longest time required for the shutter blade elements 32 and 34 to reach their maximum aperture defining position when the taking lens 18 is focused to infinity. As should also be readily apparent, focusing the lens 18 at infinity operates to move the follow focus interceptor pin 176 to the largest effective aperture limiting position to which the shutter blade elements 32 and 34 can possibly move. In this manner, the shutter blade elements 32 and 34 will always be at rest at their maximum aperture defining position upon energization of the flash array 90.

Referring again to the graph of FIG. 4c, there can be seen to be a rapid rise in the time integration of the scene light intensity incident to the photoresponsive element 46 subsequent to the energization of the flashlamp 91. The steady-state input voltage reference level at time $T_0$ to the detector circuit 132 is biased by the resistors 138 and 140 to establish the predetermined value to which the input signal at line 126 must increase in order to trigger the level detector 132. The output signal level at lines 126 and 128 from the light detecting and integrating circuit 94 generally corresponds to the graph of FIG. 4c so that the light intensity is integrated until reaching a predetermined value, as shown at A, corresponding to a select film exposure. At this point the level detector circuit 132 is triggered into an abrupt change of state at the output line 142, from a generally low value which is insufficient to maintain the transistor 144 in conduction, to a substantially higher current level of sufficient value to turn on the transistor 144 and thus establish a current flow from collector to emitter through the transistor 144. Turning on the transistor 144, in turn, operates to energize the solenoid winding 76 to retract the plunger unit 74 so as to rotate the walking beam 54 in a counterclockwise direction, as viewed from FIG. 2, against the biasing force of tension spring 80, thereby moving the shutter blade elements into their light blocking closed position. After the walking beam 54 is rotated to its full counterclockwise position, the latch 84 may be automatically moved into intercepting relation with the edge of the walking beam so as to permit the deenergization of the solenoid in a manner as is more fully described in U.S. patent application Ser. No. 554,777, supra. In this manner the exposure interval is terminated at time $T_4$ as shown graphically in FIG. 4a.

In situations where the ambient scene light intensity levels are relatively high in comparison with the graph of FIG. 4b, but portions of the photographic subject are relatively dark, the photographic apparatus should be capable of operating in a so-called "fill-in flash" mode of operation to provide supplementary illumination. However, under conditions of increased levels of ambient light intensity, the film may receive its correct exposure prior to the predetermined time period $T_2$, in which case the level detector 132 will energize the solenoid winding 76 and retract the solenoid plunger 74 prior to the time at which a flashlamp 91 would otherwise be energized. The artificial illumination control system of this invention overcomes this difficulty by providing alternate means for triggering energization of a flashlamp 91 under conditions of relatively high ambient light intensity where the exposure interval would likely be terminated prior to the predetermined delay period $T_2$.

Figure 5A:
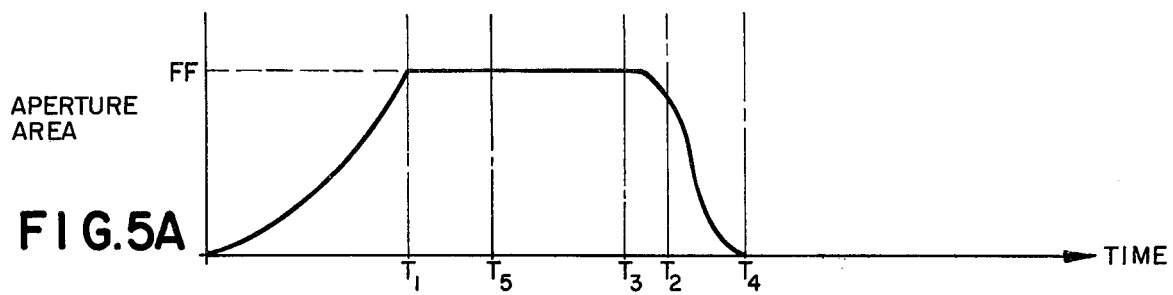
FIG. 5a is a graphical representation of aperture area vs. time for another mode of operation.
Figure 5B:
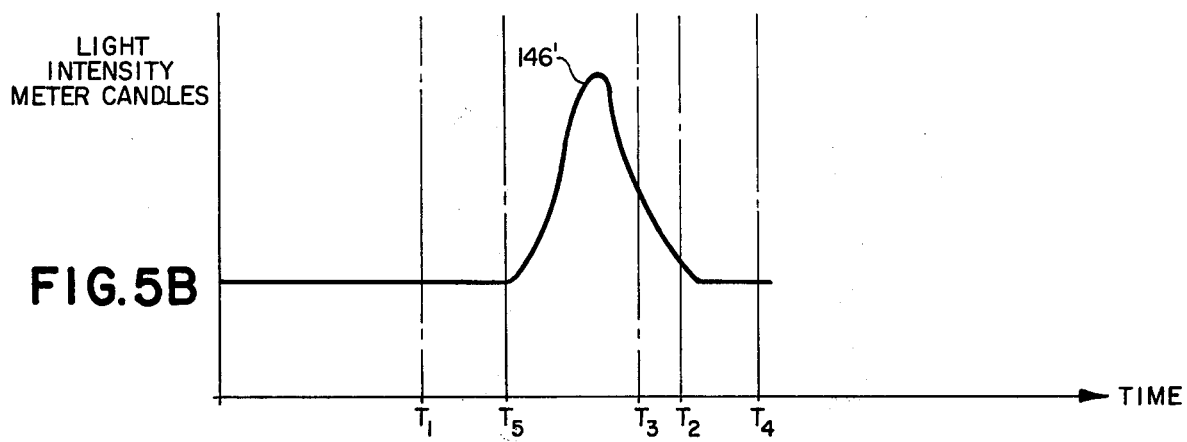

Referring now to FIG. 5a, there is again shown a graphical representation of the variation in the effective aperture area vs. time, while FIG. 5b is a graphical representation in meter-candles vs. time of a substantially higher ambient light intensity that that shown in FIG. 4b. Again, an approximate representation of the time integration of the scene light intensity incident to the photoresponsive element 46 is graphically shown by the curve of FIG. 5c in meter-candle-seconds vs. time.

The "fill-in flash" mode of operation is commenced in the previously described manner upon the depression of the photographic exposure interval initiating button $S_1$ which operates to simultaneously move the latch 84 out of engagement with the walking beam 54 as well as to energize the control circuit of FIG. 3. Disengagement of the latch 84 from the edge of the walking beam 54 permits the tension spring 80 to rotate the walking beam 54 in a clockwise direction as viewed in FIG. 2 so as to initiate the exposure interval and permit the shutter blade elements 32 and 34 to approach their maximum aperture defining position as limited by the follow focus interceptor pin 176 at time $T_1$. As a result of the increasing ambient light intensity, the time integration of the scene light intensity incident to the photoresponsive element 46 proceeds substantially more rapidly than that for the previously discussed lower ambient light intensity situation. The steady-state reference voltage signal level to the detector circuit 132 is biased by the resistors 138 and 140 at time $T_0$ to be above the predetermined value required to trigger the "fill-in flash" level detector 130. As is readily apparent, the predetermined trigger value for detector 130 is selected to be below the predetermined trigger value for the level detector 132 and preferably is only approximately 30% of the predetermined trigger value required to switch detector 132. The output voltage signal from the light detecting and integrating circuit 94 at line 126 generally corresponds to the curve of FIG. 5c so that when the output signal level at line 126 approaches a value corresponding to B, the level detector 130 will trigger to change the output signal therefrom at line 148, from a generally low value, to a substantially higher current level of sufficient value to switch the OR gate 150. The output signal at line 160 from the OR gate 150, in turn, is switched to energize an appropriate flashlamp 91 through the flash sequencing circuit 162.

Figure 5C:
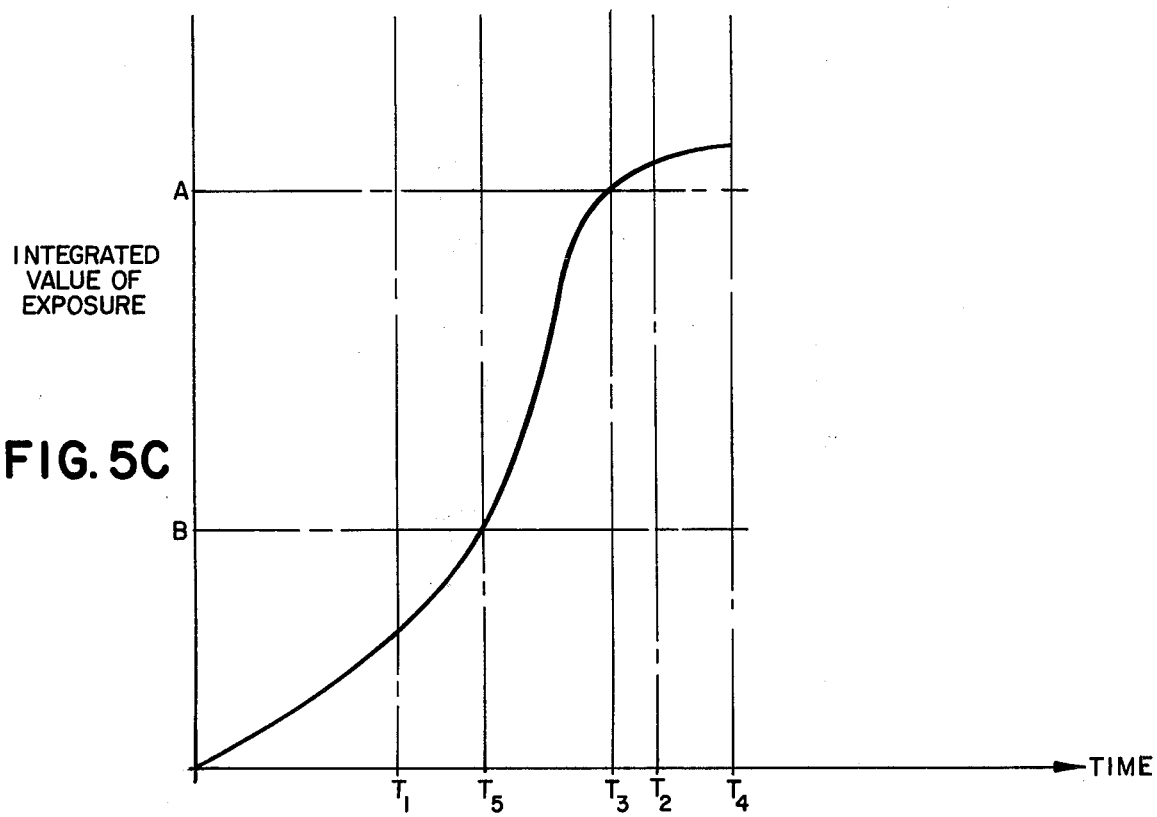

As is readily apparent from the graphs of FIGS. 5a–5c, the linear flash array 90 is energized at a time $T_5$ which is prior to the time $T_2$ at which the flashlamp would otherwise have been energized by the output signals at lines 156 and 158 from the ripple counter 116. The sudden increase in light intensity attributable to the energization of the flashlamp 91 is shown graphically by the pulse 146' and operates to precipitate a rapid increase in the value of the time integration of the scene light intensity. Thus, in the same manner as previously described, the output voltage signal of the light detecting and integrating circuit 94 approaches a value corresponding to the select film exposure A, at which point the level detector 132 is triggered to energize the solenoid winding 76. The shutter blade elements 32 and 34 are thereafter returned to their closed position terminating the exposure interval. After the walking beam 54 is rotated to its full counterclockwise position, the latch 84 may be automatically moved into intercepting relation with the edge of the walking beam so as to permit the deenergization of the solenoid as previously discussed.

Figure 6A:
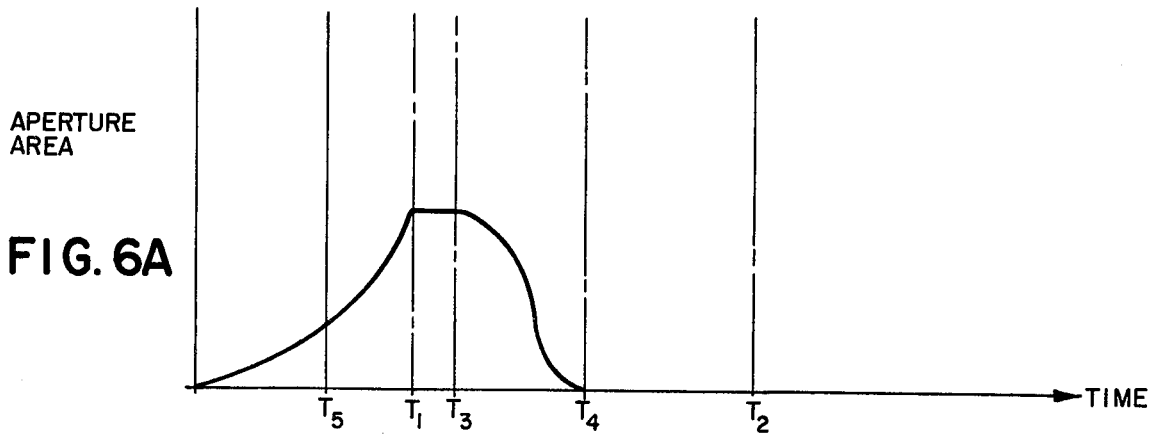
FIG. 6a is a graphical representation of aperture area vs. time for still another mode of operation.
Figure 6B:
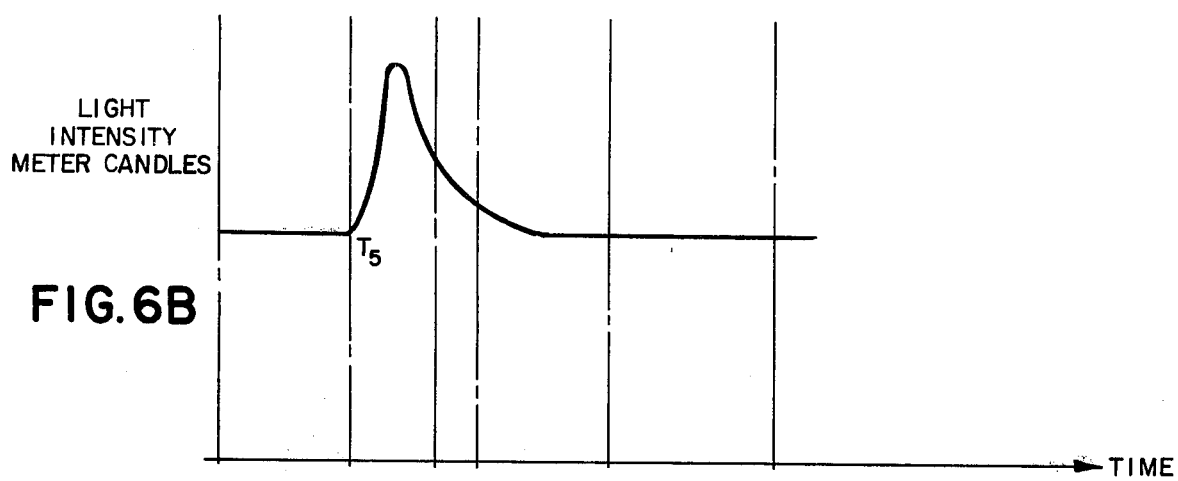
Figure 6C:
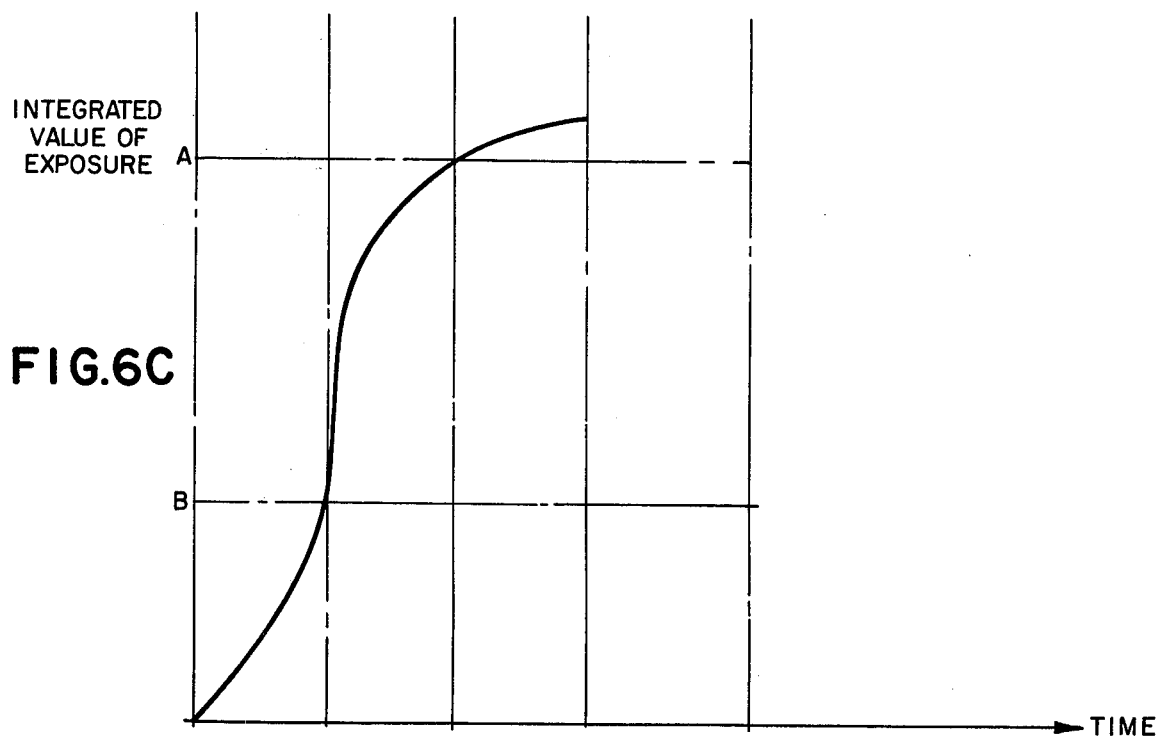

Referring now to the graphs of FIGS. 6a–6c, there is shown a graphical representation of an exposure interval where the level of ambient scene light intensity is even still higher than that shown in FIG. 5b. FIG. 6a shows the effective aperture area vs. time as defined by the shutter blade elements 32 and 34 during an exposure interval. The graph for the effective aperture area is correlated to the graph for light intensity in meter-candles vs. time as shown in FIG. 6b as well as the graph for the time integration of the scene light intensity incident to the photoresponsive element 46 in meter-candle-seconds vs. time as shown in FIG. 6c. As is readily apparent, the level of ambient light intensity is sufficient to cause such a rapid rise in the integration of the scene light intensity that the predetermined voltage level required to trigger detector 130 at time $T_5$ is reached even before the shutter blade elements reach their maximum aperture defining position as limited by the follow focus interceptor pin 176 at time $T_1$. Thus, the flashlamp 91 is energized while the shutter blade elements 32 and 34 are still moving toward their maximum effective aperture defining position. In addition, as a result of the high level of ambient light intensity, the output signal from the light detecting and integrating circuit 94 approaches the value corresponding to the correct exposure A to trigger the level detector 132 into energizing the solenoid winding 76 to terminate the exposure interval prior to the predetermined time delay $T_2$. Thus, were it not for the level detector 130, a flashlamp 91 could not have been energized by the ripple counter 116 during the exposure interval.

As is now readily apparent, a race condition is established between the level detector 130 and the ripple counter 116, such that under extremely low levels of ambient light intensity, the ripple counter 116 will operate to initiate the energization of a respective flashlamp 91 at a predetermined time period $T_2$ subsequent to the initiation of the exposure interval. Under conditions of substantially higher levels of ambient light intensity, the level detector 130 will operate to initiate the energization of a respective flashlamp 91 as a consequence of the time integration of the scene light intensity to the photoresponsive element 46 reaching a predetermined value. In this manner, the flash illumination control system may be automatically operated in both a normal flash mode of operation and in a "fill-in flash" mode of operation without regard to any external switches or buttons which would otherwise have to be actuated by the photographer. It should also be readily understood that if the respective flashlamp 91 is energized as a consequence of the level detector 130 being triggered prior to the predetermined time delay $T_2$ established by the ripple counter 116, then the subsequent output signal from the ripple counter 116 will operate only to switch the output signal at line 152 from the AND gate 154 but have no effect on the output signal at line 160 from the OR gate 150. In addition, while the system has been described in conjunction with a linear array of flashlamps, it should be readily apparent that other sources of artificial illumination such as a strobe would be equally suitable for use herein.

Figure 7:
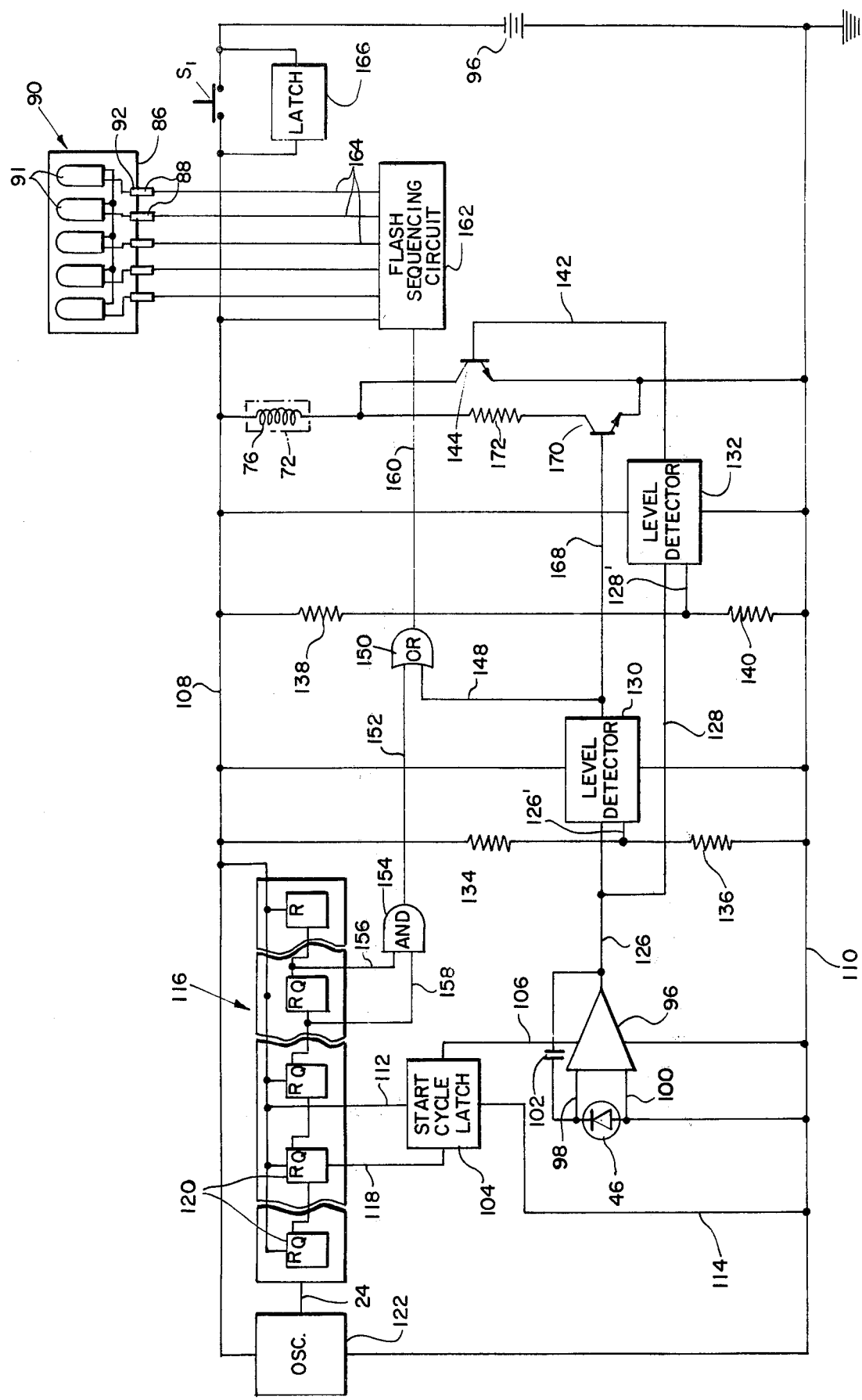
FIG. 7 is a schematic diagram showing an alternate embodiment for the artificial illumination control system of FIG. 3.

In some camera arrangements where an especially compact structure is desired, it may be either impractical or unfeasible to provide a mechanical follow focus arrangement of the above-described type. However, it may nevertheless still be desirable to limit the maximum effective aperture to which the shutter blade elements are allowed to progressively increase as a function of the subject to camera distance under high levels of ambient scene light intensity. Toward this end, there may be provided the control circuit of FIG. 7 where like numerals designate the above-described elements. The output from level detector 130 is directed by way of line 168 to the base of an NPN transistor 170 in which the emitter is in common connection with the ground line 110. The collector of transistor 170 in turn is connected to the solenoid winding 76 by way of a resistor 172. Thus, under conditions of relatively high levels of ambient scene light intensity where the level detector 130 is triggered prior to the predetermined time delay $T_2$ to ignite a respective flashlamp 91, the output signal from the level detector 130 may also be directed by way of line 168 to turn on transistor 170 and thus establish a current flow from collector to emitter through the transistor 170. Resistor 172 is selected to limit the current flow from collector to emitter of transistor 170 so as to only partially energize the solenoid winding 76 and effectively slow down and stop the movement of the solenoid plunger 74 in a manner as is more fully described in a copending application for U.S. patent Ser. No. 619,385 by E. Shenk and J. Muggli filed concurrently herewith. Thus, the forward movement of shutter blade elements 32 and 34 may be arrested during the actual exposure interval to define a maximum effective aperture in synchronism with the firing of a flashlamp 91. The maximum effective aperture is therefore programmed inversely with scene light so that high levels of scene light intensity result in relatively small maximum effective aperture while, conversely, low levels of scene light intensity result in relatively large maximum effective apertures.

Figure 8:
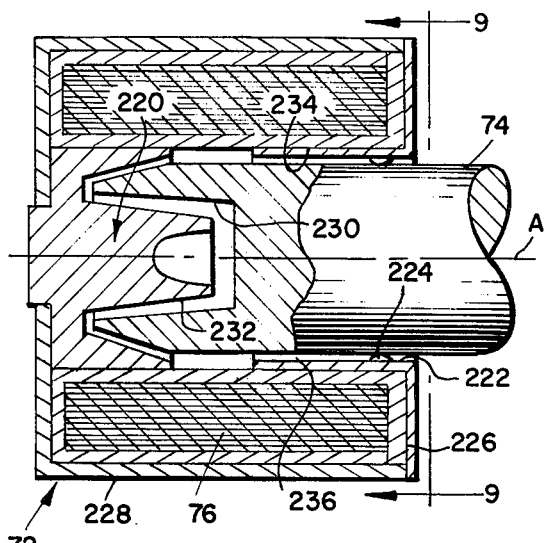
FIG. 8 is a cross-sectional side view of a portion of a solenoid utilized in conjunction with the exposure control system of this invention.
Figure 9:
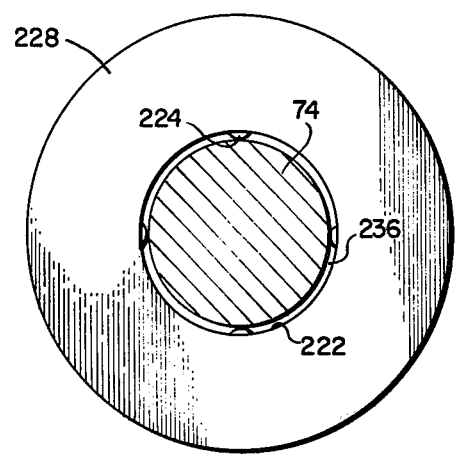
FIG. 9 is a cross-sectional view taken across the lines 9—9 of FIG. 9.
Figure 10:
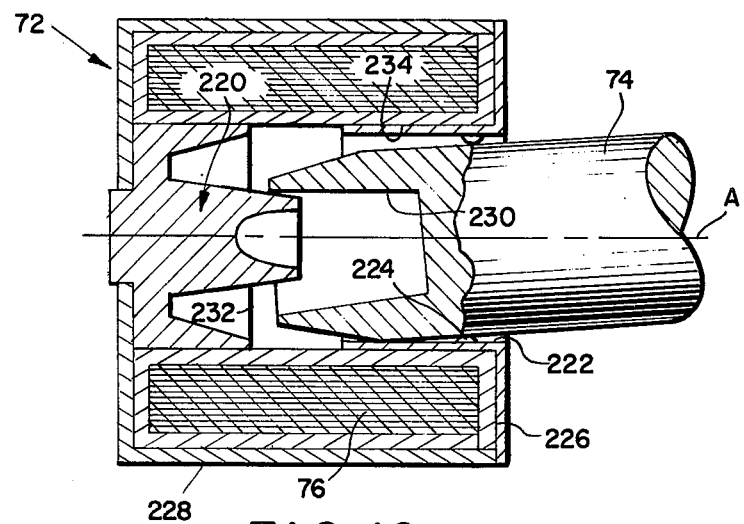
FIG. 10 is a cross-sectional view of a portion of the solenoid of FIG. 8 in a different mode of operation.

Referring now to FIGS. 8–10, there is shown in substantial detail the solenoid 72 which is particularly suited for arresting motion of the shutter blade elements 32 and 34 upon a partial energization of the solenoid winding 76. The solenoid winding 76 is spirally wound about an insulator supporting bobbin 226 which, in turn, is positioned within a U-shaped frame 228 for fixed connection with respect to the baseblock casting 12. Plunger 74 is cylindrically shaped and disposed in general concentric relation with respect to an axis A symmetrically disposed within the internal hollow core 234 of winding 76. There is also provided a stationary armature or plug 220 centrally disposed within the internal hollow core 234 of bobbin 226. The inside end face of armature 220 defines a frusto-conical surface 232 which extends loosely into a cylindrical recess 230 in the inside end face of plunger 74 in order to guide the plunger 74 in a manner which will become more apparent in the following discussion. A cylindrically shaped ferro-magnetic flux tube 222 is stationed in fixed concentric relation with respect to the bobbin 226 and in circumferentially spaced apart relation with respect to the plunger 74 so as to define an annular air gap 236 between the plunger 74 and tube 222. The end of the plunger 74 is supported in spaced apart relation with respect to the magnetic flux tube 222 by the cooperative guiding arrangement between the conical frustum 232 and the recess 230. Closely adjacent the outside end of the tube 222, there are provided a plurality of circumferentially spaced apart projections or dimples 224 which extend radially inward from the tube 222 in slidable engaging relation with respect to the plunger 74.

Solenoid 72 is designed to have a force stroke characteristic for matching operation in conjunction with the associated spring force of biasing tension spring 80. Accordingly, when the solenoid 72 is in the unenergized state, the bias exerted by tension spring 80 operates to progressively move the shutter blade elements 32, 34 in the direction of everincreasing aperture. However, when solenoid winding 76 is partially energized in the aforementioned manner, the conical frustum 232 of armature 220 defines a magnetic flux condition which saturates that portion of the plunger recess 230 closest thereto so as to pull the plunger 74 against the armature 220 during the breaking mode of operation. In this manner, the plunger 74 is moved laterally with respect to the axis A so as to assume the eccentric position as shown in FIG. 10, and thereby provide a frictional holding force during breaking. As is readily apparent, the tube 222 and dimples 224 operate to guide the plunger 74 through axial translation while also accommodating lateral displacement of the inside end face of the plunger 74.

When the control circuit determines that a proper exposure has been made in the above-described manner, winding 76 of solenoid 72 is fully energized to cause retraction of plunger 74 into the closed position as shown in FIG. 8. During plunger retraction, the stationary armature 220 cooperates with the recess 230 to guide the plunger 74 into a generally concentric position with respect to the axis A. However, as will be readily appreciated, the major diametral extent of the conical frustum 232 is preferably slightly less than the diameter of the recess 230 so as to only loosely fit therein upon full plunger retraction.

Since certain changes may be made in the abovedescribed system and apparatus without departing from the scope of the invention herein involved, it is intended that all matter contained in the description thereof or shown in the accompanying drawings shall be interpreted as illustrative and not in a limiting sense.

What is claimed is:

1. A photographic camera comprising:
   a housing;
   an objective lens mounted on said housing;
   means within said housing for receiving a source of electrical energy;
   means operatively associated with said housing for receiving a source of artificial illumination, said receiving means including electrical terminals for electrically communicating with the source of artificial illumination;

means within said housing for defining a film exposure plane;

a blade assembly mounted and arranged within said housing for displacement from an initial closed arrangement wherein said blade assembly precludes scene light from impinging on said exposure plane to a second arrangement wherein said blade assembly defines a maximum aperture through which scene light is permitted to impinge on said exposure plane and then to a final closed arrangement wherein said blade assembly again precludes scene light from impinging on said exposure plane, such a displacement of said blade assembly serving to define an exposure interval during which scene light is incident upon said film exposure plane;

scene light detecting means energizable by the source of electrical energy for providing an output signal in correspondence to the amount of scene light detected subsequent to the commencement of an exposure interval; and means, at least in part energizable by the source of electrical energy, for initiating the displacement of said blade assembly from its said initial closed arrangement towards it said second arrangement thereby commencing a particular exposure program defined by a plurality of exposure parameters and then, responsive to said output signal of said scene light detecting means reaching a first predetermined value, for effecting the displacement of said blade assembly into its said final closed arrangement, and further, responsive to said output signal of said scene light detecting means reaching a second predetermined value less than said first predetermined value prior to said blade assembly reaching its said second arrangement, for initiating the electrical energization of said terminals to effect the firing of the source of artificial illumination and otherwise responsive to the expiration of a predetermined time delay prior to which said blade assembly at least reaches said second arrangement for initiating the electrical energization of said terminals to effect the firing of the source of artificial illumination when said output signal of said scene light detecting means fails to reach said second predetermined value prior to said blade assembly reaching its said second arrangement.

2. The photographic camera of claim 1 wherein said blade assembly includes two shutter blade elements having respective primary and secondary apertures therethrough wherein the primary apertures during shutter blade displacement cooperatively define a first effective aperture for admitting scene light to said exposure plane and wherein the secondary aperture moves in correspondence with the primary aperture and cooperatively define a second effective aperture for admitting scene light to said scene light detecting means.

3. A system for controlling the energization of a source of artificial illumination during a photographic exposure interval comprising:

means for connecting said system to a source of electrical energy;

means responsive to the initiating of a photographic exposure interval for providing a first select output signal condition at a predetermined time interval subsequent to the commencement of the photographic exposure interval;

means for detecting scene light subsequent to the commencement of the photographic exposure interval in order to provide an output signal condition corresponding to said detected scene light;

means responsive to a select change in the value of the output signal condition of said detecting means after the commencement of the photographic cycle for providing a second select output signal condition; and means responsive to the occurrence of the first of said first and second select output signal conditions for initiating the energization of the source of artificial illumination.

4. The system of claim 3 wherein said scene light detecting means includes means for integrating the detected scene light so that said output signal condition from said scene light detecting means corresponds to integrated scene light and the means for providing said second select output signal condition include a level detector having means by which an input signal may be applied thereto and an output signal derived therefrom wherein the output signal from said level detector abruptly changes to said second select output signal condition in response to the input signal to the level detector reaching a predetermined value, and additionally including biasing means for establishing an input reference level to said level detector coinciding with said predetermined value wherein the difference between the reference signal level to said level detector established by said biasing means and the output signal of said integrating means at the commencement of the photographic cycle is directly proportional to said select change in the value of the output signal condition of said integrating means after the commencement of the photographic cycle.

5. The system of claim 3 wherein said means for providing said first select output signal condition at a predetermined time interval subsequent to the commencement of the photographic exposure interval includes a counter responsive to the commencement of a photograhic exposure interval, said counter having a plurality of binary circuits interconnected in serial relation for sequential actuation subsequent to the commencement of the exposure interval wherein a select binary circuit provides said first select outout signal condition at said predetermined time interval subsequent to the commencement of the photographic exposure interval.

6. The system of claim 3 wherein said means for initiating the energization of the source of artificial illumination includes an OR gate having input terminals connected to receive said first and second select output signal conditions respectively.

7. The system of claim 3 for controlling the energization of a source of artificial illumination during a photographic exposure interval in a camera of the type including a housing defining a film exposure plane, an objective lens mounted on the housing, a blade assembly, means for mounting said blade assembly for selective displacement from an initial closed arrangement wherein said blade assembly precludes scene light from impinging on said exposure plane to an open arrangement wherein said blade assembly permits scene light to impinge on said exposure plane and then to a final closed arrangement wherein said blade assembly again precludes scene light from impinging on said exposure plane, such a displacement of said blade assembly serving to define an exposure interval, and means for moving said blade assembly through said selective displacement.

8. The system of claim 7 wherein said blade assembly defines a range of progressively increasing sized apertures as it moves from its initial closed arrangement to its open arrangement and said predetermined time period substantially coincides with the time period required for said blade assembly to move from its scene light precluding position to its maximum aperture defining position.

9. The system of claim 7 wherein the camera includes follow focus means for limiting the maximum sized aperture to which the blade assembly may progressively increase as a function of objective lens focusing when the camera is utilized in conjunction with the source of artificial illumination, said predetermined time period being greater than or equal to the time required for said blade assembly to move from its initial closed arrangement to its open arrangement as limited by the follow focus means.

10. The system of claim 7 including means responsive to said second select output signal condition for actuating said moving means subsequent to the displacement of said blade assembly from said initial arrangement at the commencement of said exposure interval to stop said blade assembly in an arrangement allowing a select scene light to impinge on said exposure plane together with means for actuating said moving means to initiate displacement of said blade assembly into its said final closed arrangement in response to a second select change in the value of the output signal condition of said detecting means wherein said second select change is greater than said first select change.

11. A system for controlling the energization of a source of artificial illumination during a photographic exposure interval in a camera apparatus of the type including a housing defining a film exposure plane, an objective lens mounted on the housing and means for selectively blocking and unblocking the admission of scene light to the film exposure plane, said system comprising:
means for accommodating connection of said system to a source of electrical energy;
means responsive to the initiation of a photographic interval for providing a first select output signal condition at a predetermined time period subsequent to the commencement of the photographic exposure interval wherein said select signal condition can operate to initiate the energization of the source of artificial illumination;
means for detecting scene light incident to the camera apparatus subsequent to the commencement of the photographic exposure interval in order to provide an output signal condition corresponding to said detected scene light; and
means responsive to a select change in the value of the output signal condition of said detecting means after the commencement of the photographic exposure interval for providing a second select output signal condition which operates to initiate the energization of the source of artificial illumination at a time prior to the instant at which the source of artificial illumination would otherwise be energized by said first select output signal condition, should said select change not occur prior to said predetermined time period.

12. The system of claim 11 wherein said scene light detecting means include means for integrating the detected scene light so that said output signal condition from said scene light detecting means corresponds to integrated scene light and the means for providing said second select output signal condition include a level detector having means by which an input signal may be applied thereto and an output signal derived therefrom wherein the output signal from said level detector abruptly changes to said second select output signal condition in response to the input signal to the level detector reaching a predetermined value, and additionally including biasing means for establishing an input reference signal level to said level detector coinciding with said predetermined value wherein the difference between the reference signal level to said level detector established by said biasing means, the output signal condition of said integrating means at the commencement of the photographic cycle is directly proportional to said select change in the value of the output signal condition of said integrating means after the commencement of the photographic cycle.

13. The system of claim 11 wherein said means for providing said first select output signal condition at a predetermined time interval subsequent to the commencement of the photographic exposure interval includes a counter responsive to the commencement of a photographic exposure interval and having a plurality of binary circuits interconnected in serial relation for sequential actuation subsequent to the commencement of an exposure interval wherein a select binary circuit provides said first select output signal condition at said predetermined time interval subsequent to the commencement of the photographic exposure interval.

14. The system of claim 11 wherein the scene light blocking and unblocking means include: a blade assembly and means for mounting and moving said blade assembly through selective displacement from an initial closed arrangement wherein said blade assembly precludes scene light from impinging on said exposure plane to an open arrangement wherein said blade assembly permits scene light to impinge on said exposure plane and then to a final closed arrangement wherein said blade assembly again precludes scene light from impinging on said exposure plane, such a displacement of said blade assembly serving to define an exposure interval wherein said blade assembly defines a range of progressively increasing sized apertures as it moves from its initial closed arrangement to its open arrangement and said predetermined time period is at least equal to the time period required for said blade assembly to move from its scene light precluding position to its maximum aperture defining position.

15. The system of claim 14 wherein the camera includes follow focus means for limiting the maximum size aperture to which the blade assembly may progressively increase as a function of objective lens focusing when the camera is utilized in conjunction with the source of artificial illumination.

16. The system of claim 11 wherein: the scene light blocking and unblocking means include a blade assembly and means for mounting and moving said blade assembly through selective displacement from an initial closed arrangement wherein said blade assembly precludes scene light from impinging on said exposure plane to an open arrangement wherein said blade assembly permits scene light to impinge on said exposure plane and then to a final closed arrangement wherein said blade assembly again precludes scene light from impinging on said exposure plane, such a displacement of said blade assembly serving to define an exposure interval, said mounting and moving means includes an electromagnetic device for moving said blade assembly from said open arrangement to said final closed arrangement, and said system additionally including means responsive to said second select output signal condition for partially engaging said electromagnetic device to stop said blade assembly in an arrangement allowing a select scene light to impinge on said exposure plane together with means for fully engaging said electromagnetic device to initiate displacement of said blade assembly into its said final closed arrangement in response to a second select change in the value of the output signal condition of said detecting means wherein said second select change is greater than said first select change.

17. A photographic camera apparatus of the type which may be used in conjunction with a source of artificial illumination and a source of electrical energy, said camera apparatus comprising:
a housing defining a film exposure plane;
an objective lens mounted on the housing;
means for selectively blocking and unblocking the admission of scene light to said film exposure plane;
means responsive to the initiating of a photographic exposure interval to provide a first select output signal condition at a predetermined time period subsequent to the commencement of the photographic exposure interval wherein said select signal condition can operate to initiate the energization of the source of artificial illumination from the source of electrical energy;
means for detecting scene light incident to said camera apparatus subsequent to the commencement of the photographic exposure interval in order to provide an output signal condition corresponding to said detected scene light; and means responsive to a select change in the value of the output signal condition of said detecting means after the commencement of the photographic exposure interval for providing a second select output signal condition which operates to initiate the energization of the source of artificial illumination from the energy source at a time prior to the instant at which the source of artificial illumination would otherwise be energized by said first select output signal condition, should said select change not occur prior to said predetermined time period.

18. The apparatus of claim 17 wherein said scene light detecting means include means for integrating the detected scene light so that said output signal condition from said scene light detecting means corresponds to integrated scene light and the means for providing said second select output signal condition include a level detector having means by which an input signal may be applied thereto and an output signal derived therefrom wherein the output signal from said level detector abruptly changes to said second output signal condition in response to the input signal to the level detector reaching a predetermined value, and additionally including biasing means for establishing an input reference level to said level detector coinciding with said predetermined value wherein the difference between the input signal level to said level detector established by said biasing means and the output signal condition of said integrating means at the commencement of a photographic cycle is directly proportional to said select change in the value of the output signal condition of said integrating means after the commencement of the photographic cycle.

19. The apparatus of claim 17 wherein said means for providing said first select output signal condition at a predetermined time interval subsequent to the commencement of the photographic exposure interval includes a counter responsive to the commencement of a photographic exposure interval and having a plurality of binary circuits interconnected in serial relation for sequential actuation subsequent to the commencement of an exposure interval wherein a select binary circuit provides said first select output signal condition at said predetermined time interval subsequent to the commencement of the photographic exposure interval.

20. The apparatus of claim 17 wherein the scene light blocking and unblocking means include: a blade assembly and means for mounting and moving said blade assembly through selective displacement from an initial closed arrangement wherein said blade assembly precludes scene light from impinging on said exposure plane to an open arrangement wherein said blade assembly permits scene light to impinge on said exposure plane and then to a final closed arrangement wherein said blade assembly again precludes scene light from impinging on said exposure plane, such a displacement of said blade assembly serving to define an exposure interval wherein said blade assembly defines a range of progressively increasing sized apertures as it moves from its initial closed arrangement to its open arrangement and said predetermined time period is at least equal to the time period required for said blade assembly to move from its scene light precluding position to its maximum aperture defining position.

21. The apparatus of claim 20 wherein the camera includes follow focus means for limiting the maximum sized aperture to which the blade assembly may progressively increase as a function of objective lens focusing when the camera is utilized in conjunction with the source of artificial illumination.

22. The apparatus of claim 17 wherein: the scene light blocking and unblocking means include a blade assembly and means for mounting and moving said blade assembly through selective displacement from an initial closed arrangement wherein said blade assembly precludes scene light from impinging on said exposure plane to an open arrangement wherein said blade assembly permits scene light to impinge on said exposure plane and then to a final closed arrangement wherein said blade assembly again precludes scene light from impinging on said exposure plane, such a displacement of said blade assembly serving to define an exposure interval, said mounting and moving means includes an electromagnetic device for moving said blade assembly from said open arrangement to said final closed arrangement, and said system additionally includes means responsive to said second select output signal condition for partially engaging said electromagnetic device to stop said blade assembly in an arrangement allowing a select scene light to impinge on said exposure plane together with means for fully engaging said electromagnetic device to initiate displacement of said blade assembly into its said final closed arrangement in response to a second select change in the value of the output signal condition of said detecting means wherein said second select change is greater than said first select change.

* * * * *